United States Patent [19]

Kondo

[11] 4,114,994
[45] Sep. 19, 1978

[54] FOCUS DETECTING SYSTEM
[75] Inventor: Toshihiro Kondo, Chofu, Japan
[73] Assignees: Toshihiro Kondo, Chofu; Fuji Photo Film Co. Ltd., Minami-asigara, both of Japan
[21] Appl. No.: 750,005
[22] Filed: Dec. 13, 1976
[30] Foreign Application Priority Data
Dec. 11, 1975 [JP] Japan .................. 50-148021
Aug. 3, 1976 [JP] Japan .................. 51-92472
[51] Int. Cl.² .............................................. G03B 3/00
[52] U.S. Cl. .................................. 352/139; 354/25
[58] Field of Search .................... 354/25, 195, 200; 352/139, 140

[56] References Cited
U.S. PATENT DOCUMENTS
3,398,665  8/1968  John .................................. 354/25
3,450,018  6/1969  John .................................. 354/25

OTHER PUBLICATIONS
*The British Journal of Photography*, Jul. 4, 1975, pp. 594–596.

Primary Examiner—Monroe H. Hayes
Attorney, Agent, or Firm—Gerald J. Ferguson, Jr.; Joseph J. Baker

[57] ABSTRACT

In an optical instrument like photographic cameras, a light refracting optical element such as a prism having different parts effecting refraction in different directions is located substantially on an image plane of the objective of the optical instrument and periodically moved in the plane to bring the different parts to a point on the plane periodically. When the image formed on the plane is just focused on the light refracting optical element, the image viewed from behind stands still. When the image formed on the plane is out of focus, that is the image is not focused precisely on the light refracting optical element, the image viewed from behind periodically moves.

2 Claims, 15 Drawing Figures

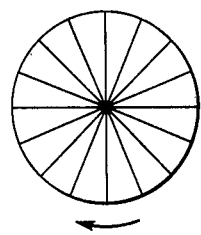
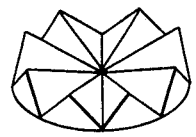
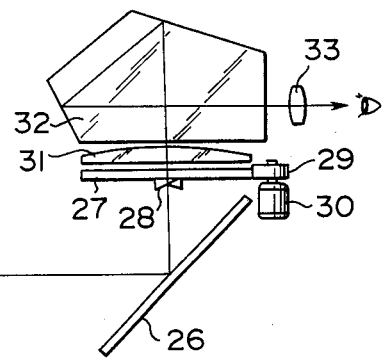
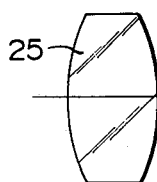
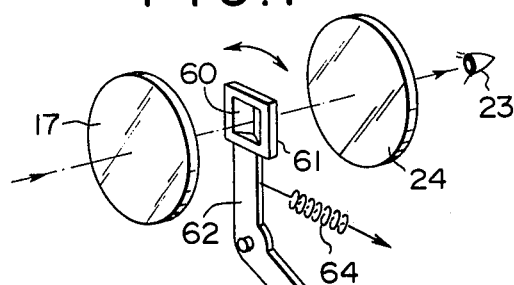
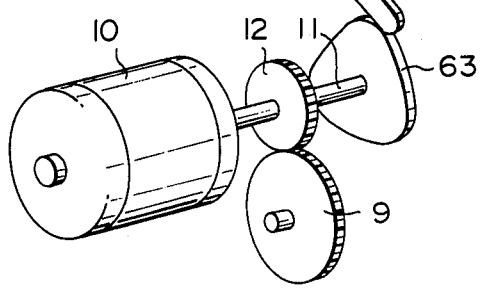
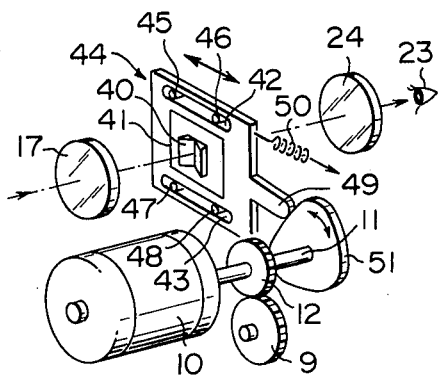

FOCUS DETECTING SYSTEM

BACKGROUND OF THE INVENTION

1. Field of the Invention

This invention relates to a device for detecting the focus in a photographic and motion picture camera, and more particularly to a device for representing the condition of focus on a plane in a camera or the like to facilitate the adjustment of focus of an image formed by an objective.

2. Description of the Prior Art

It has been known in the art to focus an image formed by an objective on a focusing plate and detect the focus by viewing and measuring the sharpness of the image by eyes through a view finder system. In this kind of focus detecting device, the quantity of light is lost by the focusing plate which is generally a diffusing plate such as a ground glass. Further, it is difficult to detect the focus when the subject is dark. Particularly for the short-sighted, the detection of the focus is difficult. Although this kind of device is provided on the focusing plate with a prism for splitting image, it is sometimes insufficient in cases as above.

SUMMARY OF THE INVENTION

The object of the present invention is to provide a device for detecting or representing the focus of an image formed by an objective in a camera or the like wherein the detection is facilitated and accordingly the focus adjustment can easily be conducted even for dark subjects or for the short-sighted.

A specific object of the present invention is to provide a device for detecting the focus of an image formed by an objective in which the condition of focus is represented by the degree of vibration or periodical movement of a part of the image formed by the objective.

The above objects are accomplished by providing a light refracting optical element such as a prism on the focal plane of the objective and periodically moving the optical element in the focal plane to bring different parts of the element having effect of refracting light in different directions to a point on the focal plane. When the image formed by the objective is focused precisely on the focal plane, i.e. on the light refracting optical element, the image viewed from behind stands still. When the image is out of focus on said plane, that is the image is not focused precisely on the light refracting optical element, the image viewed from behind is periodically moved. When the optical element is rotated about the optical axis of the objective, the image viewed is moved in a circle around the optical axis. When the optical element is reciprocated across the optical axis, the image viewed is also reciprocated in the direction lateral to the optical axis.

BRIEF DESCRIPTION OF THE DRAWING

FIGS. 4A and 4B are views showing another example of the light refracting optical element which can be used in this invention, FIG. 5 is a side view of another embodiment of the present invention embodied in a single lens reflex camera, FIGS. 7 and 8 are perspective views showing examples of variations of the light refracting optical element drive mechanism employed in a motion picture camera wherein the present invention is embodied.

DESCRIPTION OF THE PREFERRED EMBODIMENTS

Figure 1:
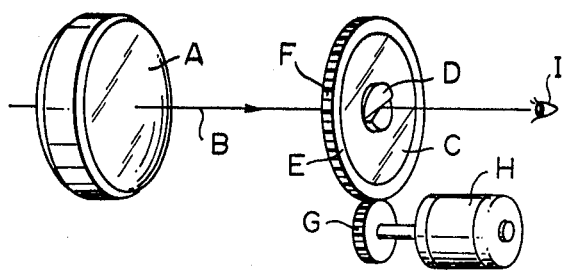
FIG. 1 is a perspective view showing an embodiment of the present invention embodied in an optical instrument having a viewing system right behind the objective.
Figure 2A:
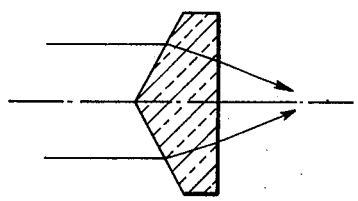
FIGS. 2A to 2D are cross-sectional views of several examples of the light refracting optical element which can be used in the present invention and which are reciprocated across the optical axis of the objective.
Figure 2B:
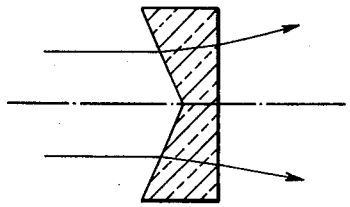
Figure 2C:
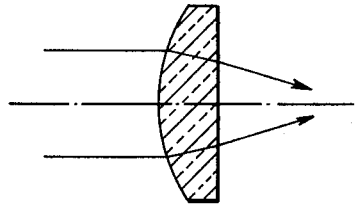
Figure 2D:
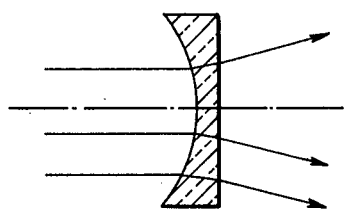
Figure 3A:
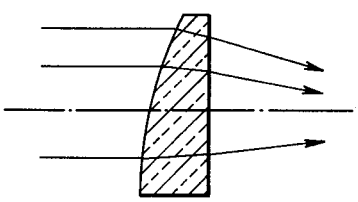
FIGS. 3A to 3D are cross sectional views of several other examples of the light refracting optical element which can be used in the present invention and which are rotated or reciprocated on the plane normal to the optical axis of the objective.
Figure 3B:
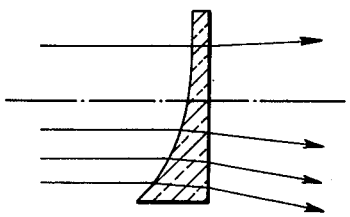
Figure 3C:
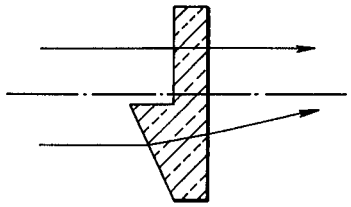
Figure 3D:
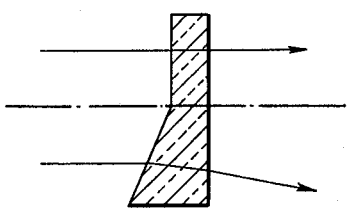

A principal embodiment of the present invention is shown in FIG. 1 which is applicable to various optical instruments having an objective and a viewing means. Referring to FIG. 1, substantially on the focal plane of an objective A is located a transparent disc C which has at the center thereof a split image type prism D. Thus, the prism D is located on the optical axis B of the objective A. The transparent disc C is supported by an annular holder E which has on the periphery thereof teeth F. The teeth F are meshed with teeth of a gear G fixed to a drive shaft of a motor H so that the disc C is rotated by the motor H. As the disc C rotates, the prism D is rotated about the optical axis B to bring different parts thereof having effect of refracting light in different directions to a point on the focal plane of the objective A. When the image formed by the objective A is focused just on the prism D, the image viewed with eyes I from behind stands still. When the image is not focused on the prism D, that is the image focused is axially apart from the prism D, the image viewed vibrates or periodically moves in the direction parallel to the image plane. More exactly, as the prism D rotates about the optical axis B at a predetermined frequency, the image viewed with eyes I moves in a circle around the optical axis at the same frequency as that at which the prism D is rotated.

The light refracting optical element as said prism D is designed to have different parts having effect of refracting light in different directions and is periodically moved in such a direction that the different parts are brought to a point on the image plane. FIGS. 2A to 2D show several examples of the light refracting optical element which can be used in the present invention. The elements shown in FIGS. 2A to 2D are symmetric in cross section, and accordingly should not be rotated about its axis to bring said different parts to a point on the image plane. For instance, these elements are reciprocated to cross the optical axis or rotated about an axis displaced radially from its center of symmetry. If the elements having a cross section as shown in FIGS. 2A to 2D are symmetric with respect a plane, they can be rotated. FIGS. 3A to 3D show several other examples of the light refracting optical element which are symmetric with respect to a plane. Therefore, these elements are reciprocated to cross their plane of symmetry to bring different parts thereof to a point on the image plane. FIGS. 4A and 4B show another example of the light refracting optical element which is to be rotated about its center.

Referring to FIG. 5 which shows an embodiment of this invention incorporated in a single lens reflex camera, mirror 26 is located behind objective 25 to reflect light therefrom upward to condenser lens 31 horizontally provided. Light passing through lens 31 is reflected by penta prism 32 twice and directed rearward to eyepiece 33. Beneath lens 31 is horizontally and rotatably located focusing plate 27 which is transparent and has at the center split prism 28 like said element D. Focusing plate 27 is a disc and is friction engaged with friction roller 29 driven by motor 30. When image formed by objective 25 is just focused on focusing plate 27, i.e. on split prism 28, image viewed through eyepiece 33 stands still. When image is not on the plane of focusing plate 27, image viewed which is not blurred as in conventional camera wherein image is focused on light diffusing focusing plate vibrates at the central portion. In other words, sharp image can be viewed, but the central portion thereof passing through prism 28 vibrates, more exactly, moves in a circle. The photographer can easily focus the image by rotating focusing ring to find the place where the vibrating image stands still.

If a photodetector having a limited light receiving face is located at a position on which the image focused on the focusing plate 27 or said disc D is focused by means of a focusing means, it becomes possible to detect the focus electrically. In more detail, in this case, an alternating current component may be derived from the output of the photodetector to see if the image has a vibrating component. By causing the image to vibrate at a predetermined frequency, it is facilitated to derive the A.C. component from the output since the output may contain alternating or fluctuating component of various frequency when the subject to be photographed contains moving components.

Figure 6:
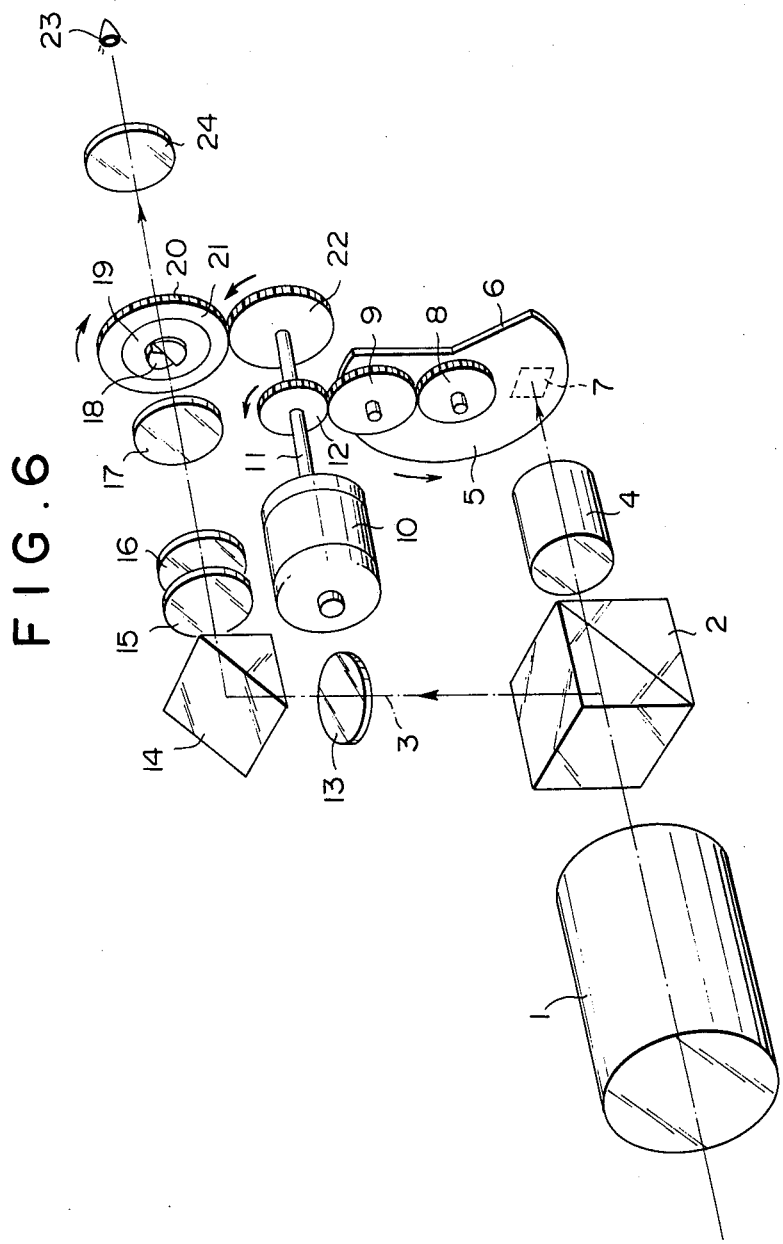
FIG. 6 is a perspective view of still another embodiment of the present invention embodied in a motion picture camera.

An embodiment applied to a motion picture camera is shown in FIG. 6 wherein objective 1 includes focusing lens group and zooming lens group which are axially movable. Beam splitter 2 is located behind objective 1 to divide light therefrom into first light for exposure of film passing through film aperture 7 and second light for viewfinder system advancing along viewfinder optical path 3. The first light passing through beam splitter 2 advances through relay lens 4. Between relay lens 4 and film aperture 7 is provided rotary shutter 6 having open section 6. The shaft of shutter 5 is fixed to gear 8 which is connected with drive gear 12 by way of gear 9. Drive gear 12 is fixed to drive shaft 11 of motor 10. Another gear 22 is fixed to drive shaft 11 for rotating split prism 18 mounted on the center of transparent disc 19 which is supported by annular holder 21 carrying teeth 20 on the periphery thereof engaged with the gear 22. The light reflected by beam splitter 2 advances through viewfinder objective 13, is reflected by prism 14, passes through field lenses 15, 16 and erector lens 17 to form an image of a subject on disc 19. The image formed on disc 19 is viewed through eyepiece 24 by eye 23. When image is focused precisely on disc 19, i.e. on prism 18, image viewed stands still. Otherwise, image vibrates as in foregoing embodiment shown in FIG. 5.

The prism 18 may not be rotated on the optical axis, but laterally reciprocated across the optical axis. One embodiment employing such a prism is shown in FIG. 7, wherein elements equivalent to those shown in FIG. 6 are designated by the same reference numerals. Cam 63 is fixed to drive shaft 11. Cam follower lever 62 is engaged with cam 63 to be swung back and forth thereby. Cam follower lever 62 has on the top thereof a mask 61 which holds prism 60. As shaft 11 rotates, prism 60 is reciprocated across the optical axis of lenses 17 and 24. When the image is focused precisely on prism 60, the image viewed by eye 23 stands still.

Another embodiment is shown in FIG. 8 in which cam follower is pin 49 integrally fixed to frame 44. Frame 44 has transparent plate 41 which carries at its center a prism 40 as said prism 60, and is slid back and forth guided along pins 45–48 which slidably engage in slots 42 and 43. Tension spring 50 urges frame 44 to cause it to follow cam 51 which corresponds to said cam 63.

I claim:

1. A device for detecting focus in a motion picture camera which has an objective comprising a light refracting optical element located substantially on a focal plane of the objective of the optical instrument, said light refracting optical element having different parts effecting refraction of light in different directions, a transparent disc having disposed therein at the center thereof said light refracting element, means for rotating said transparent disc and said optical element in a plane parallel to the focal plane so that said different parts of said optical element are periodically brought to a point on said plane parallel to the focal plane, and viewing means for viewing an image focused by said objective from a side of the light refracting optical element opposite to the objective, said viewing means having an optical axis where said optical element rotates about said optical axis to effect ready viewing through said viewing means and where the image surrounding said light refracting optical element is viewed in focus through the transparent disc surrounding the light refracting element to facilitate focusing of the camera, a shutter mechanism, and a motor for driving said shutter mechanism and said means for rotating the camera.

2. A device for detecting focus as defined in claim 1 including holding means for said transparent disc and light refracting optical element and a first gear fixed to a drive shaft of the motor, a second gear disposed on the periphery of said holding means, and means for transmitting the rotation of the first gear to the second gear.

* * * * *